July 6, 1926.  1,591,181
F. A. POLLMILLER
ADJUSTABLE TEMPLE AND TIP FOR SPECTACLES OR GOGGLES
Filed August 10, 1925
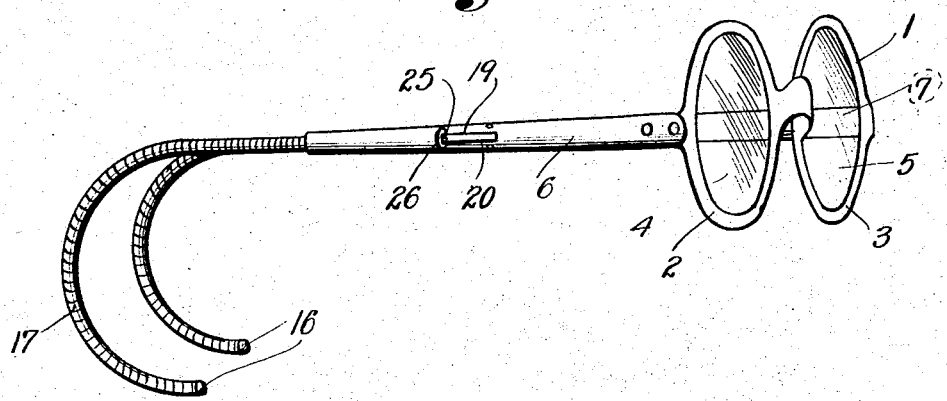
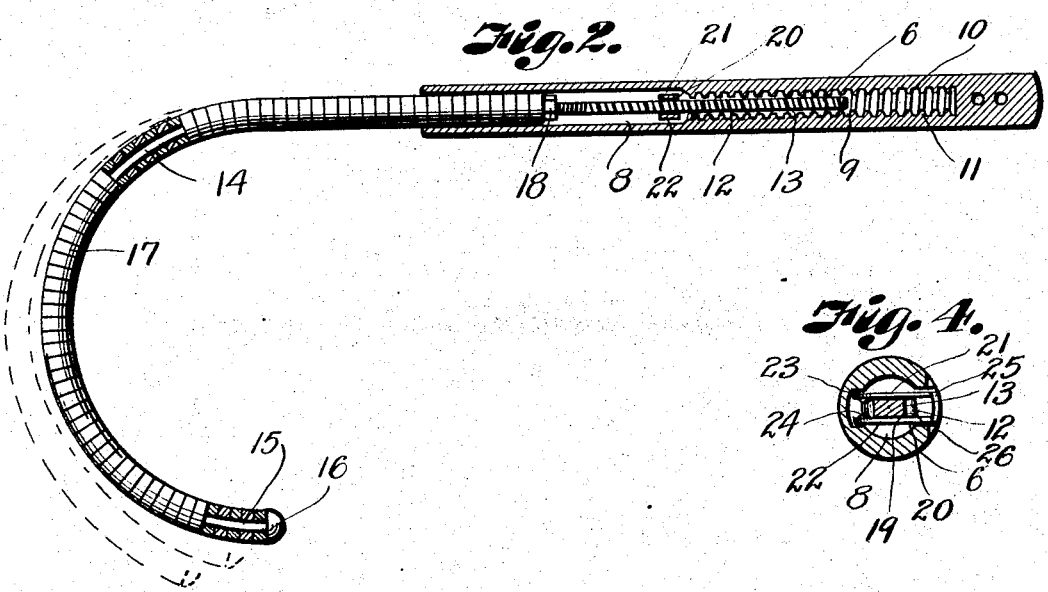
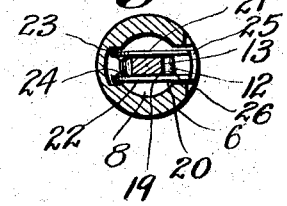
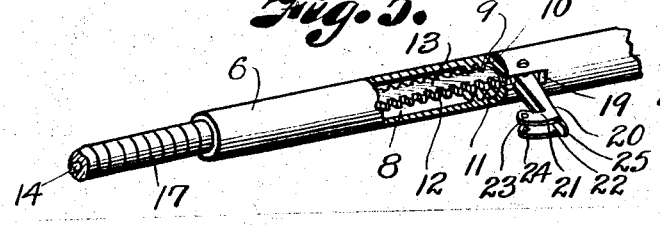
INVENTOR
Fred A. Pollmiller.
ATTORNEY Patented July 6, 1926.

1,591,181

UNITED STATES PATENT OFFICE.

FRED A. POLLMILLER, OF ARGENTINE, KANSAS.

ADJUSTABLE TEMPLE AND TIP FOR SPECTACLES OR GOGGLES.

Application filed August 10, 1925. Serial No. 49,237.

This invention relates to adjustable temples and tips for spectacles (which term shall be understood to include goggles) and has for its principal object to provide for the adjustment of the temples to the required length and the tips to the required shape for comfortably fitting the spectacles or goggles to the wearer. Usually the temples for spectacles are made of flexible wire with curved ends to fit over the ears, the ends being adapted to be bent or partly straightened to fit the wearer. The number of adjustments that can be made on any one pair of spectacles is confined within comparatively narrow limits. Therefore, spectacle frames are made in different sizes which requires a necessarily varied stock to be carried by the optician.

According to my invention, a single frame with a single set of temples may be made to fit practically any wearer because the adjustment can be extended over a relatively wide range, the temple proper being adjusted as to length, and the tip (which is really a part of the temple and will hereinafter be understood as included in the term) being adjusted as to curvature to fit the spectacles to the wearer.

In carrying out the invention, the frame is provided with socket members constituting temple bars, and temple members are adjustably received in the socket members, there being means for latching the temple members to the socket members so that after the adjustment has been made the two will be rigidly held together. There are various ways of accomplishing the desired result, but I have illustrated one form of my invention in the drawings, in which—

Fig. 1 is a perspective view of a pair of spectacles constructed in accordance with my invention.

Fig. 2 is an enlarged sectional view through one of the socket members, the temple member being shown in elevation, parts being broken away to show the washers on the curved end of the temple member.

Fig. 3 is a sectional view through the socket member at right angles to the view shown in Fig. 2, the temple member being shown in elevation.

Fig. 4 is a sectional view on the line 4—4 of Fig. 3, and

Fig. 5 is a perspective view of one end of the socket member, parts being broken away to show the received end of the temple member, the latch being shown in perspective.

The spectacle frame 1, consisting of the two rims 2 and 3 carrying the lenses 4 and 5, may be of usual construction. To the sides of the frame 1 are fastened the socket members 6 and 7 constituting parts of the temples and which may be adapted for connection with any type of hinge or other attachment to the rims. Each socket member is provided with an elongated bore or channel 8 having a constricted end 9 provided with notches 10 formed by a screw thread 11 to receive the projections 12 on the flat end 13 of the temple member 14. The temple member 14 may consist of flexible wire flattened as at 13 and having a curved end 15 with a head or button 16 on its lower extremity. The curved end 15 preferably carries a plurality of washers or disks 17 to provide the necessary diameter for the curved portion which extends back of the ears of the wearer. The washers may be threaded upon the curved end 15 of the temple member 14 and held against movement lengthwise of the wire by the button 16 at one end and by an adjusting nut 18 at the other. The adjusting nut 18 is slightly in rear of the flat portion 13 of each temple member and bears against the front end washer so that by tightening or loosening the nut, pressure is exerted on or relieved from the washers and the curvature of the tip shortened or lengthened to adjust it to the ear of the wearer. The bore 8 of the socket member at its free end is preferably of substantially the diameter of the washers 17 so that they will snugly fit the same, as clearly shown in Fig. 2. By providing the flat portion 13 on each temple member with projections or teeth cut on the same pitch line as the screw thread in the socket member, it will be apparent that the temple members may be screwed into and out of the socket members to make the necessary adjustment. Each socket member is provided with an elongated slot 19 in which is pivoted a latch member 20 having a bifurcated end formed by the two fingers 21 and 22 provided with lateral bosses or projections 23 and 24. The fingers are adapted to ride over the sides of the flattened portion 13 of the temple member so that the bosses or projections 23 and 24 may engage in the spaces between the projections or teeth 12 on the flattened portion 13 to prevent the temple member from being turned. The end of the latch is provided with a lip or projection 25 which rests in an inclined portion 26 of the slot so that the nail of the operator or a sharp instrument may be received between the lip or projection 25 and the socket member to swing the latch to the position shown in Fig. 5 when it is desired to turn the temple member to effect the desired adjustment. When the desired adjustment has been effected, the latch will be swung back to the position shown in Fig 3, the outer face of the latch being flush with the socket member so that there will be no protruding parts.

I prefer to provide the washers 17, at least those adjacent the temple bars, with corresponding scale designations such as numbers, alternating colors or otherwise so that extension of the tip members on the bar members at opposite sides may correspond and thereby balance the temples for proper adjustment of the lenses and for the comfort of the wearer.

The socket member may be made of any suitable material as may also the washers, and the adjustment may be made by any suitable set of notches adapted to adjustably receive projections on the flat bar 13, so I do not wish to be limited to the exact details of construction shown, but reserve the right to make such changes in form, proportion and minor details of construction as properly come within the scope of the appended claims.

What I claim and desire to secure by Letters-Patent is:—

1. In combination with a spectacle frame, temples connected with the frame, each comprising a socket member having a restricted, screw-threaded inner end, and having a slot, a tip member having a flat screw portion threaded into the socket, and a latch on said socket member having a bifurcated leg for engaging the flat portion of the tip to retain the parts in adjusted position.

2. In combination with a spectacle frame, temples connected with the frame, each comprising separate socket and tip members, the tip member comprising a wire having an outer portion provided with a button at one end and screw threads at the other end, washers on said wire, a nut threaded on said wire engaging the washers to adjustably compress the same in the direction of the button, and means at the inner end of the wire for attaching the same to the socket member.

3. In combination, a spectacle frame, elongated socket members fastened to the frame, internal threads in the socket members, temples having flat ends provided with projections cut on the pitch angle of the threads engaging the temples, and latches carried by the socket members having portions engageable in the spaces between the projections.

4. In combination, a spectacle frame, socket members carried by the frame having internal notched portions, temples having flat portions provided with projections for engaging the notched portions to effect adjustment between the socket members and the temples, and a latch on each socket member having a bifurcated end to overlie the flat walls of the flat portion of the temple to prevent turning of the flat portion.

5. In combination, a spectacle frame, socket members carried by the frame having internal notched portions, temples having flat portions provided with projections for engaging the notched portions to effect adjustment between the socket members and the temples, and a latch on each socket member having a bifurcated end adapted to overlie the flat portion of the temple and provided with projections engaging the spaces between the projections on the flat portion of the temple.

6. In combination, a spectacle frame, socket members on the respective sides of the spectacle frame each having a central bore provided with a constricted portion having threads, and adjustable temples consisting of wires having flat portions formed with projections for engaging the threads, and washers on the wires, the diameters of which are substantially equal to the diameter of the bore.

In testimony whereof I affix my signature.

FRED A. POLLMILLER.